(12) United States Patent
Ratnakar et al.

(10) Patent No.: US 8,520,699 B2
(45) Date of Patent: *Aug. 27, 2013

(54) APPARATUS AND METHODS FOR PROVIDING A COMMUNICATION QUALITY FEEDBACK OF AN END-TO-END COMMUNICATION PATH

(75) Inventors: Niranjan N. Ratnakar, Bridgewater, NJ (US); Prashanth Hande, Somerset, NJ (US); Sundeep Rangan, Jersey City, NJ (US); Atul Maharshi, South Orange, NJ (US); Subhadeep P. Roy, Piscataway, NJ (US); Ritesh K. Madan, Jersey City, NJ (US); Ozge Koymen, Jersey City, NJ (US); Siddharth Ray, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 12/963,889

(22) Filed: Dec. 9, 2010

(65) Prior Publication Data
US 2012/0147759 A1    Jun. 14, 2012

(51) Int. Cl.
*H04J 3/16* (2006.01)
*H04L 12/28* (2006.01)
*H04L 1/18* (2006.01)

(52) U.S. Cl.
USPC ............ 370/465; 714/749; 370/395.21

(58) Field of Classification Search
USPC ............ 370/395.21, 278, 282, 333, 216–220, 370/230–235; 375/222, 220, 219; 714/746–749, 750, 751; 455/69, 68, 132–135
See application file for complete search history.

(56) References Cited

U.S. PATENT DOCUMENTS

| | | | |
|---|---|---|---|
| 6,898,250 B2 | 5/2005 | Lee et al. | |
| 6,987,730 B2 * | 1/2006 | Hata et al. ..................... | 370/232 |
| 7,099,409 B2 | 8/2006 | Yousef | |
| 7,630,949 B1 * | 12/2009 | Duffield et al. ................. | 706/48 |
| 2006/0095942 A1 | 5/2006 | van Beek | |
| 2007/0091815 A1 | 4/2007 | Tinnakornsrisuphap et al. | |
| 2007/0213038 A1 | 9/2007 | Masseroni et al. | |
| 2008/0191816 A1 | 8/2008 | Balachandran et al. | |
| 2009/0013356 A1 | 1/2009 | Doerr et al. | |
| 2012/0147936 A1 * | 6/2012 | Rangan et al. ................ | 375/222 |

OTHER PUBLICATIONS

International Search Report and Written Opinion—PCT/US2011/063150—ISA/EPO—Feb. 15, 2012.

* cited by examiner

*Primary Examiner* — Hanh N Nguyen
(74) *Attorney, Agent, or Firm* — James K. O'Hare

(57) ABSTRACT

The apparatus and methods described herein are used to provide a communication quality feedback of an end-to-end communication path between an application transmitter and an application receiver. One method includes transmitting data from the application transmitter to the application receiver via the end-to-end communication path, the end-to-end communication path having at least one wireless link with a wireless transmitter and a wireless receiver, generating, at the wireless transmitter, a first communication quality feedback message, and transmitting the first communication quality feedback message from the wireless transmitter to the application transmitter in a standardized format.

36 Claims, 5 Drawing Sheets

APPARATUS AND METHODS FOR PROVIDING A COMMUNICATION QUALITY FEEDBACK OF AN END-TO-END COMMUNICATION PATH

BACKGROUND

1. Field

The invention relates to wireless communications. More particularly, the invention relates to apparatus and methods for providing a communication quality feedback of an end-to-end communication path.

2. Background

FIG. 1 is a simplified prior art system 100 showing protocol stacks for a transmitter 101 and a receiver 106. The two protocol stacks are based on the Open System Interconnection (OSI) Reference Model. The two protocol stacks are simplified examples for the transmitter 101 and the receiver 106. The simplified protocol stack for the transmitter 101 (listed top-down) includes an application layer 102, a transport layer 103, a data link layer 104, and a physical layer 105. The simplified protocol stack for the receiver 106 (listed top-down) includes an application layer 107, a transport layer 108, a data link layer 109, and a physical layer 110. The two physical layers 105 and 110 are connected to a wired-wireless network 113 and are configured to deliver (both in single-cast and multi-cast) streaming and real-time multimedia data.

The physical layers 105 and 110 include a set of rules that specifies the electrical and physical connection between the transmitter 101 and the receiver 106. At the device interfaces, the physical layers 105 and 110 specify the procedure for a correct transfer of data on slots, for example, TDMA/FDMA, encryption, interleaving, channel coding, FEC, and the reverse functions.

The data link layers 104 and 109 indicate how the transmitter 101 and the receiver 106 gains access to the medium specified in the physical layers 105 and 110. The data link layers 104 and 109 also define data formats, to include the framing of data within transmitted messages, error control procedures and other link control activities. From defining data formats to including procedures to correct transmission errors, the data link layers 104 and 109 are responsible for the reliable delivery of information. The data link layers 104 and 109 may be divided into two sublayers: a Logical Link Control (LLC) and a Media Access Control (MAC).

The transport layers 103 and 108 include an end-to-end real-time transport protocol (RTP)/real-time control protocol (RTCP) for providing standardized real-time feedback from the receiver 106 to the transmitter 101. One or more channels 111 and 112 may be used to transmit the control information. Both the RTP and the RTCP convey media data flows over a transmission control protocol (TCP) or a user datagram protocol (UDP). The RTP carries data with real-time requirements while the RTCP conveys information of the participants and monitors the quality of the RTP session. The transport layers 103 and 108 are responsible for guaranteeing that the transfer of information occurs correctly after a route has been established through the network 113. The transport layers 103 and 108 are used for error control, sequence checking, and other end-to-end data reliability factors.

The application layers 102 and 107 act as a window through which the applications gain access to all of the services provided by the underling protocols.

Data links in wireless networks by nature experience large variations in short term data rates due to changing channel and interference conditions. In packet networks supporting bursty data, network loading can also change rapidly. For many applications, buffering can be used to average out these variations. Slower rate adaptation can then be used, in conjunction with the buffering, to track out longer term changes in the channel rate.

However, buffering leads to delays which may not be permissible in certain interactive applications. That is, with tight delay constraints, short term drops in data rates results in dropped packets. In these cases, it is useful for the application to have fast feedback of the data communication losses so that the application can rapidly adjust to the lower rate and compensate for losses appropriately.

Two examples where such fast feedback is useful is (1) interactive or delay-sensitive video and (2) multi-player gaming video. Video can often be transmitted with a large range in quality by changing the spatial, temporal or pixel resolution. Feedback on the instantaneously channel rate can be used to adapt the video quality appropriately. Also, highly compressed video is typically transmitted with predictive coding to exploit temporal correlations. In predictive coding, frames at any one time instant are referenced against previous video frames. As a result, losses of video frames can propagate to several future frames until the next synchronization or intra-frame. Hence, fast feedback is useful to detect these losses quickly to reduce the error propagation.

In multi-player gaming video, communication losses result in state disconnect between different players. For example, the first player can think he has fired while the second player does not know he has been shot. In this example, fast detection of losses is needed to minimize the time delay in the discrepancies between the different player states.

As illustrated in the above examples, wireless channels can be unreliable and prone to errors and the end-to-end feedback from the wireless channel losses can be used at the application layers 102 and 107. The communication protocols (such as RTP and RTCP) of the transport layers 103 and 108 provide the end-to-end feedback from the receiver 106 to the transmitter 101 and vice versa. RTCP packets contain direct information for quality of service (QoS) monitoring and congestion control of wireless channels. For example, sender reports (SR) and receiver reports (RR) exchange information on packet loss, jitter, and round-trip delay statistics of wireless channels. The transmitting end applications deliver SR to the receiving end applications and the receiving end applications deliver RR to the transmitting end applications.

The end-to-end feedback can be used by the transmitter 101 to adapt its channel rate to adjust to the channel errors. Also, the end-to-end feedback can be conducted completely at the transport layers 103 and 108 so the physical layers 105 and 110 are transparent to the applications. However, the end-to-end feedback has several drawbacks. First, the end-to-end feedback has the cost of the round-trip end-to-end delay. Second, in wireless links, the end-to-end feedback consumes air-link resources, thus limiting the frequency of the feedback. Third, the receiver 106 might not be capable of generating and/or transmitting the feedback.

Therefore, it has been recognized by those skilled in the art that a need exists for apparatus and methods for providing a communication quality feedback of an end-to-end communication path between an application transmitter and an application receiver.

SUMMARY

The apparatus and methods described herein are used to deliver multimedia content or data over a communication path involving a wireless link. The apparatus and methods are used to reduce the feedback delay, reduce or avoid consumption of air-link resources, and generate feedback when the receiver does not generate and/or transmit feedback.

The apparatus and methods described herein are used to provide a communication quality feedback of an end-to-end communication path between an application transmitter and an application receiver. One method includes transmitting data from the application transmitter to the application receiver via the end-to-end communication path, the end-to-end communication path having at least one wireless link with a wireless transmitter and a wireless receiver, generating, at the wireless transmitter, a first communication quality feedback message, and transmitting the first communication quality feedback message from the wireless transmitter to the application transmitter in a standardized format.

An apparatus for providing a communication quality feedback of an end-to-end communication path to an application receiver. The apparatus includes an application transmitter for transmitting data to the application receiver via the end-to-end communication path, the end-to-end communication path having at least one wireless link with a wireless transmitter and a wireless receiver, the wireless transmitter configured to generate a first communication quality feedback message and transmit the first communication quality feedback message from the wireless transmitter to the application transmitter in a standardized format.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Methods, apparatus, and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements.

Figure 1:
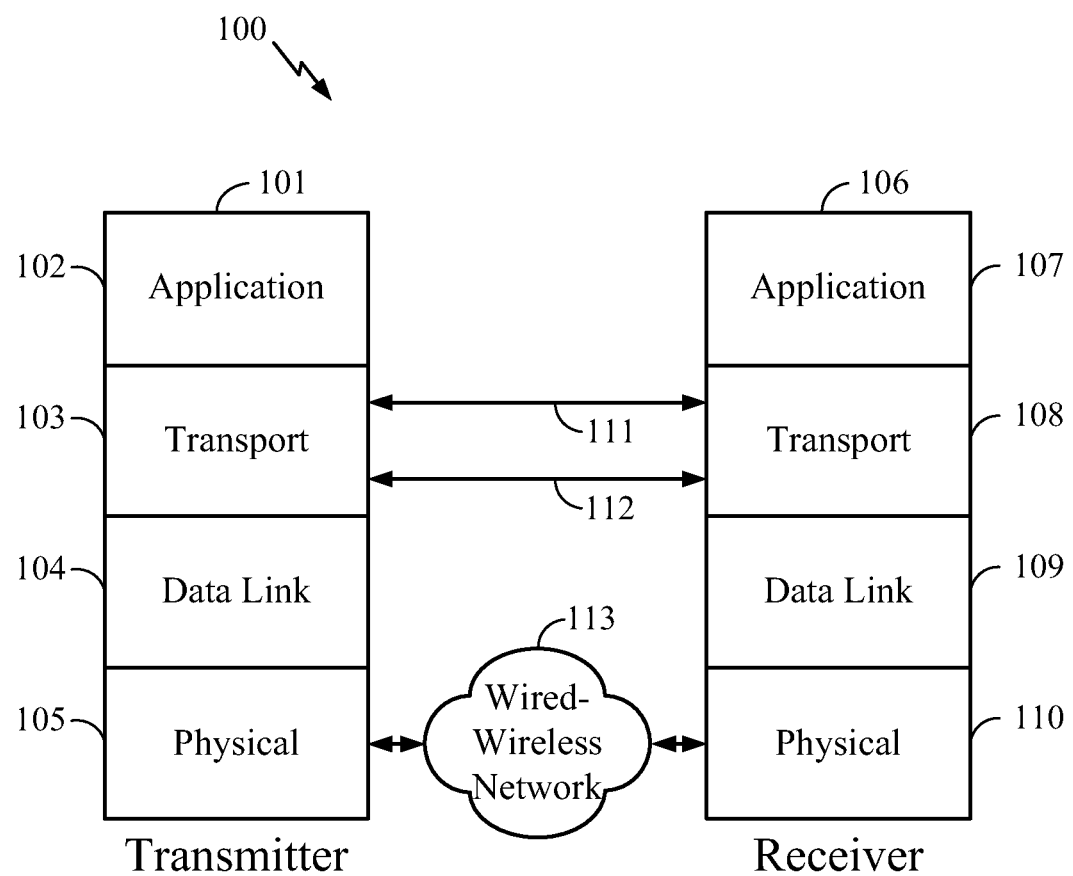
FIG. 1 is a simplified prior art system showing protocol stacks for a transmitter and a receiver.
Figure 2:
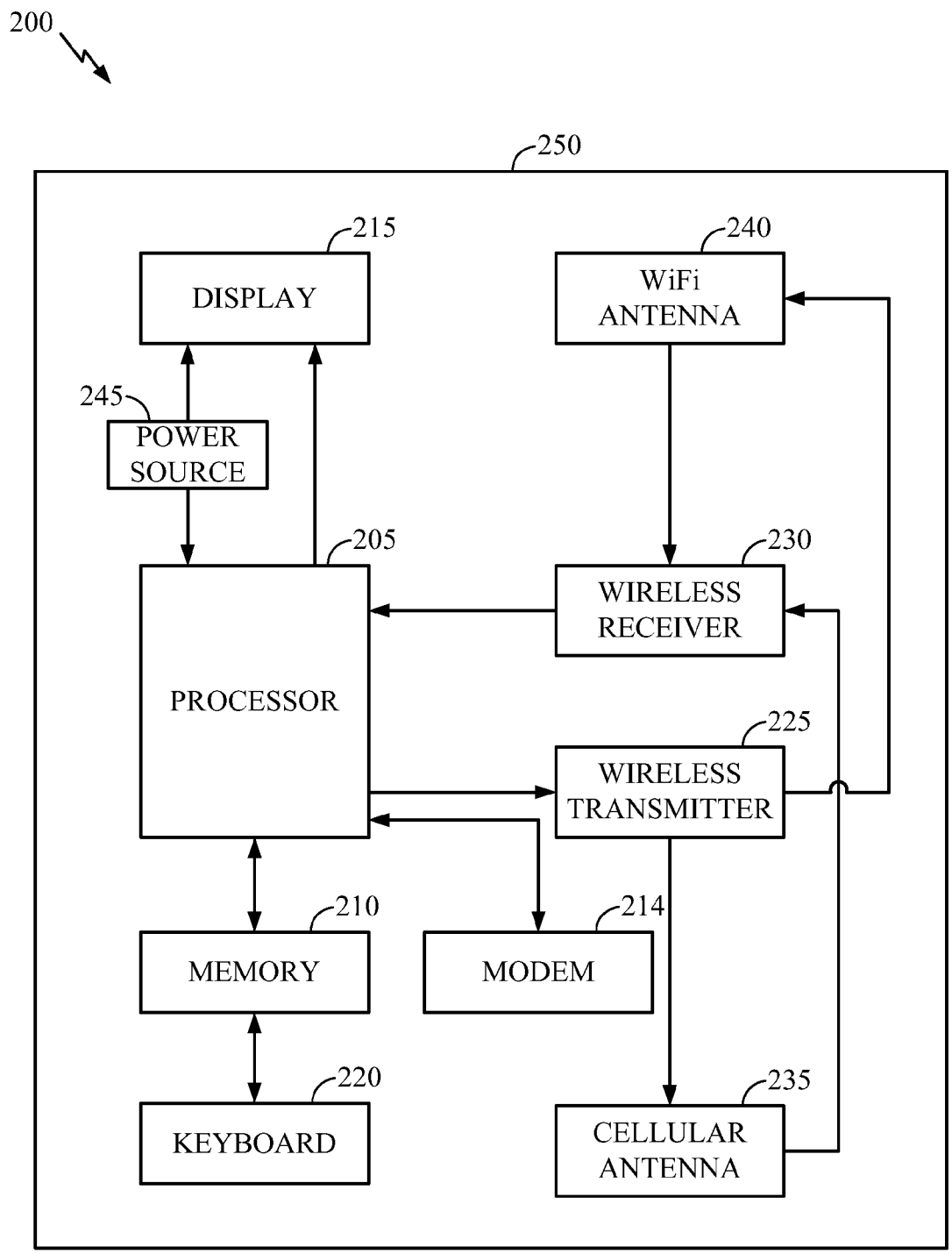
FIG. 2 is a block diagram of an exemplary node in accordance with various embodiments.

FIG. 2 is a block diagram of an exemplary node 200 (e.g., a wireless device) in accordance with various embodiments. The wireless device 200 is configured to receive and transmit signals and data in or using the licensed spectrum and/or the unlicensed spectrum. The data may be control data, multimedia data, voice data, video data, picture data, streaming or still video data, web page data, and other types of data. The wireless device 200 may include a processor 205, a memory 210, a modem 214, a display or a touch screen 215, a keyboard 220, a wireless transmitter 225, a wireless receiver 230, a first antenna 235, a second antenna 240, and a power source 245 (e.g., a battery). The wireless transmitter 225 and/or the wireless receiver 230 may be used to generate the RTCP feedback. The chips, components or modules may be attached or formed on a printed circuit board 250. The printed circuit board 250 can refer to any dielectric substrate, ceramic substrate, or other circuit carrying structure for carrying signal circuits and electronic components within the wireless device 200.

The processor 205 may be implemented using hardware, software, firmware, middleware, microcode, or any combination thereof. The processor 205 may be an Advanced RISC Machine (ARM), a controller, a digital signal processor (DSP), a microprocessor, an encoder, a decoder, circuitry, a processor chip, or any other device capable of generating and processing data, and combinations thereof. The processor 205 may be used to generate the RTCP feedback. The term "circuitry" may include processor circuitry, memory circuitry, RF transceiver circuitry, power circuitry, video circuitry, audio circuitry, keyboard circuitry, and display circuitry.

The memory 210 may include or store various routines and data. The term "memory" and "machine readable medium" include, but are not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data. The machine readable instructions may be stored in the memory 210 and may be executed by the processor 205 to cause the processor 205 to perform various functions as described in this disclosure.

The modem 214 may be implemented using software, hardware, circuitry, and combinations thereof. The modem 214 may be a wireless modem with RTCP proxy and may be used to generate the proxied RTCP feedback. The display 215 may be a LCD, LED, plasma display screen or a touch screen and the keyboard 220 may be a standard keyboard (e.g., a QWERTY layout) having letters and numbers. The keyboard 220 may be implemented on or using the touch screen.

The wireless transmitter 225 is coupled to the processor 205 and is used to encode and format the data for transmission via the first antenna 235 and/or the second antenna 240. The wireless transmitter 225 includes chips, circuitry and/or software that are used to transmit the data and/or signals that are received from the processor 205 to the first antenna 235 and/or the second antenna 240 for transmission over one or more channels.

The wireless receiver 230 is coupled to the processor 205 and is used to decode and parse the data after being received from the first antenna 235 and/or the second antenna 240. The wireless receiver 230 includes chips, circuitry and/or software that are used to receive the data and/or signals from the first antenna 235 and/or the second antenna 240. The data and/or signals are sent to the processor 205 for calculation and/or use by the processor 205.

The first antenna 235 may be positioned at a lower right portion of the wireless device 200 and the second antenna 240 may be positioned at an upper right portion of the wireless device 200. The first antenna 235 may be a cellular antenna, a GSM antenna, a CDMA antenna, a WCDMA antenna, or any other antenna capable of operating using the licensed spectrum. The second antenna 240 may be a WiFi antenna, a GPS antenna, or any other antenna capable of operating using the unlicensed spectrum. The power source 245 (e.g., a battery) supplies power to the components or modules shown in FIG. 2.

Figure 3:
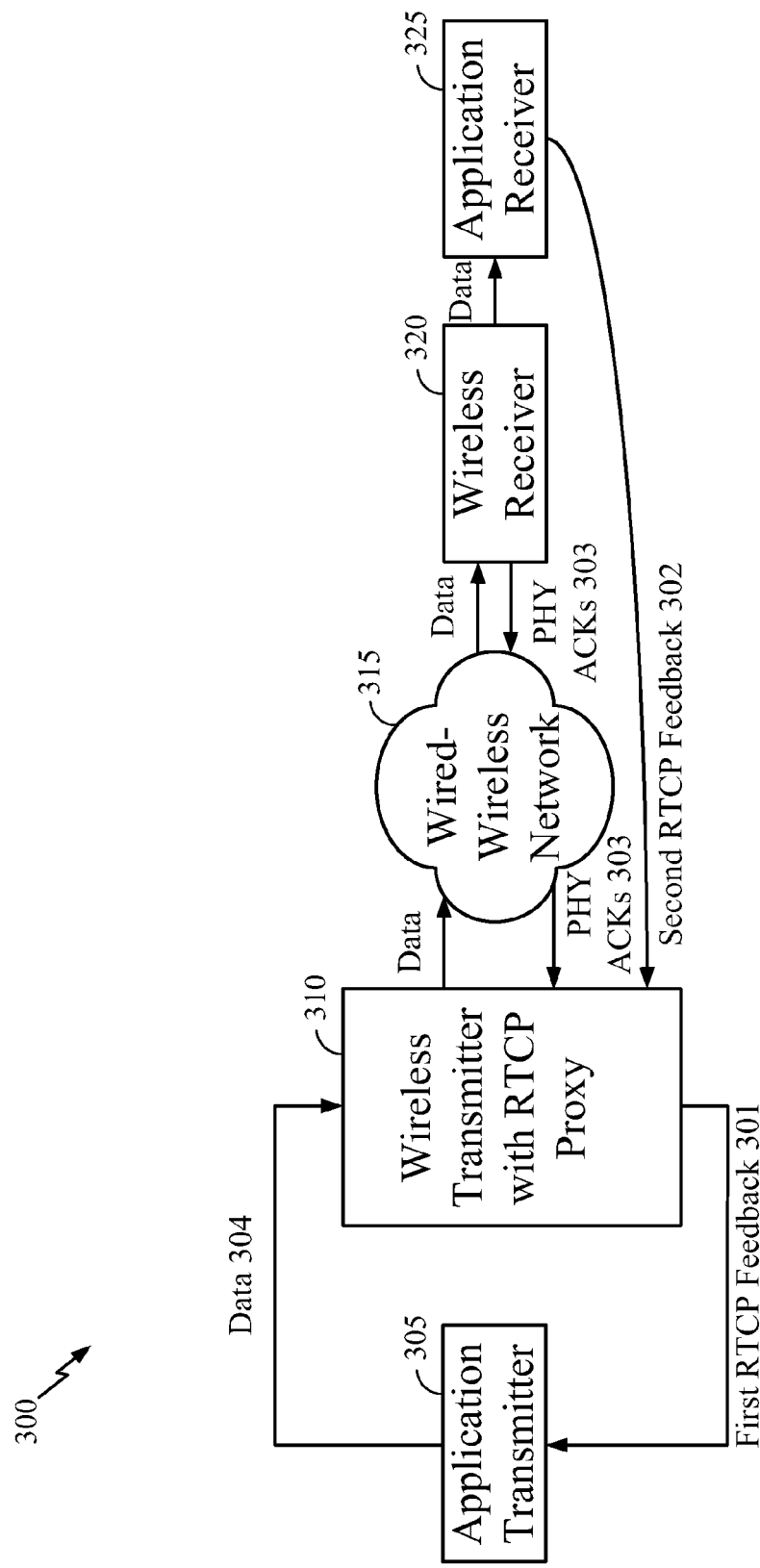
FIG. 3 is a simplified block diagram of a system having an application transmitter, a wireless transmitter, a wired and/or wireless network, a wireless receiver, and an application receiver in accordance with various embodiments.

FIG. 3 is a simplified block diagram of a system 300 having an application transmitter 305, a wireless transmitter 310, a wired and/or wireless network 315, a wireless receiver 320, and an application receiver 325 in accordance with various embodiments. The wireless transmitter 310 may be a wireless modem with RTCP proxy.

The application transmitter 305 may be used to transmit application data (e.g., a plurality of applications and the information on each of the plurality of applications) to the application receiver 325. The application transmitter 305 may generate a transmission stream for transmitting the plurality of applications and the information on each of the plurality of applications to the application receiver 325. For example, the application transmitter 305 may generate the plurality of applications and the information on each of the plurality of applications in the form of an MPEG-2 transmission stream, sequentially converts the MPEG-2 transmission stream into an object carousel, a data carousel, and a MPEG-2 digital storage media command and control (DSM-CC) message, and broadcasts the DSM-CC message.

The wireless transmitter 310 and/or the wireless receiver 320 can be implemented in a similar manner to the wireless device 200 shown in FIG. 2 or can be implemented using one or more of the components or devices of the wireless device 200 shown in FIG. 2. Other configurations can also be used to implement the wireless transmitter 310 and/or the wireless receiver 320. The wireless transmitter 310 and/or the wireless receiver 320 may each be a transceiver capable of transmitting and receiving data and/or signals. The application transmitter 305, the wireless transmitter 310, the wired and/or wireless network 315, the wireless receiver 320, and/or the application receiver 325 are configured to execute the algorithms, computations, and methods described herein. The algorithms, computations, and methods described herein can be implemented using hardware, software, and combinations thereof.

The application transmitter 305 and the wireless transmitter 310 may be co-located or located in different areas (i.e., non-co-located). Similarly, the application receiver 325 and the wireless receiver 320 may be co-located or located in different areas (i.e., non-co-located).

In various embodiments, the wired-wireless network 315 can include one or more networks such as a local area network (LAN), a wireless local area network (WLAN), a wireless fidelity (WiFi) network, an unlicensed network (i.e., a network operating in the unlicensed spectrum), a licensed network (i.e., a network operating in the licensed spectrum) and/or a carrier sense multiple access with collision avoidance (CSMA/CA) network.

Figure 4:
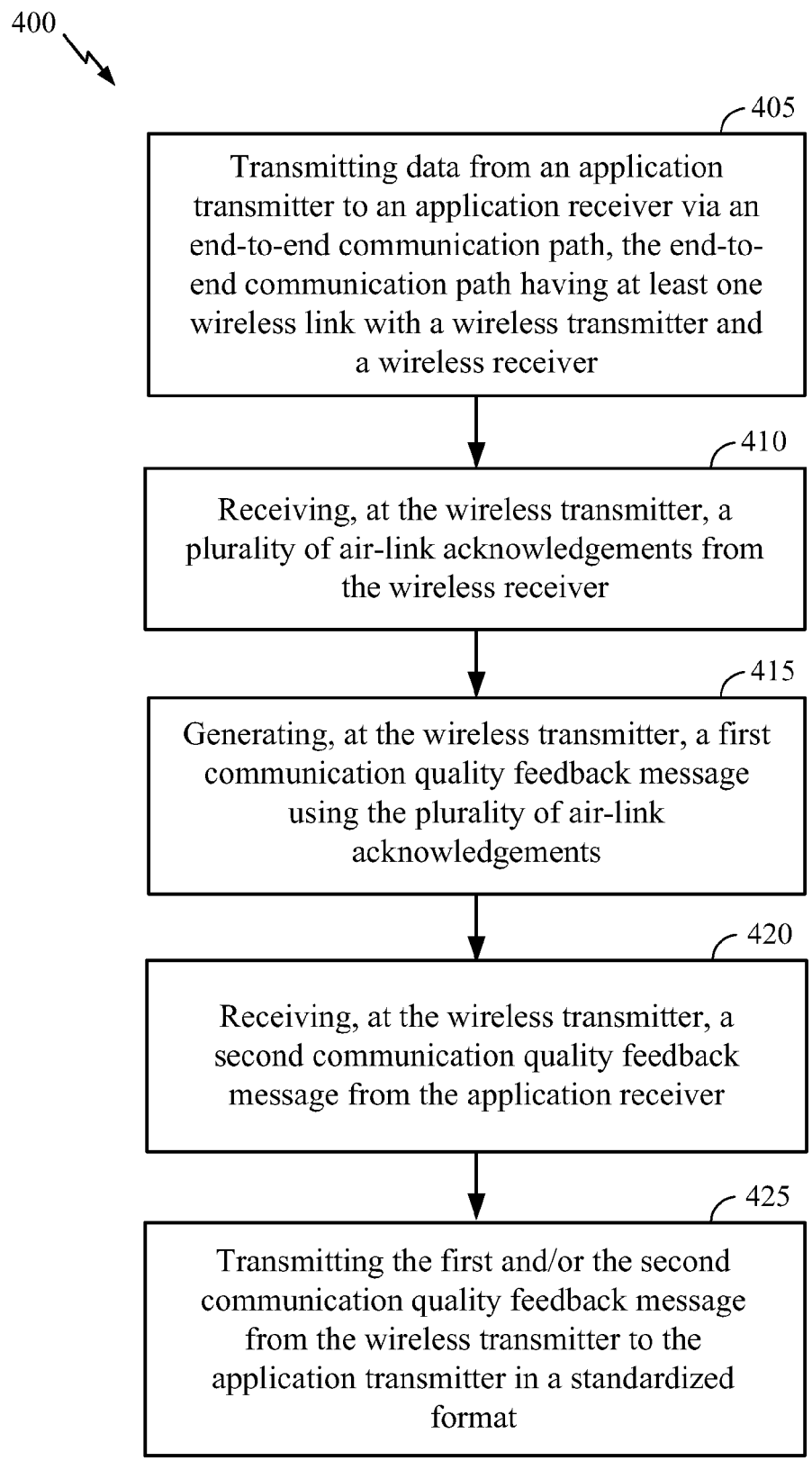
FIG. 4 is a flow chart illustrating a method of providing a communication quality feedback of an end-to-end communication path between the application transmitter and the application receiver in accordance with various embodiments.

FIG. 4 is a flow chart illustrating a method 400 of providing a communication quality feedback of an end-to-end communication path between the application transmitter 305 and the application receiver 325 in accordance with various embodiments. Referring to FIGS. 3 and 4, the application transmitter 305 transmits data 304 to the application receiver 325 via the end-to-end communication path (block 405). Data 304 may be application data, control data, multimedia data, voice data, video data, picture data, streaming or still video data, web page data, and other types of data. As an example, the end-to-end communication path is a wired and/or wireless communication path beginning at the application transmitter 305 and ending at the application receiver 325 as shown in FIG. 3. In another example, the end-to-end communication path includes at least one wireless link with the wireless transmitter 310 and the wireless receiver 320 (block 405). In one embodiment, the at least one wireless link can be the wireless network 315 as shown in FIG. 3.

The application transmitter 305 may receive end-to-end feedback from the application receiver 325. That is, the application receiver 325 may provide or transmit the end-to-end feedback (e.g., an estimation of various parameters such as throughput, jitter, and delay) encapsulated in a standardized packet format (e.g., RTCP), to the application transmitter 305. Typically, the end-to-end feedback is a feedback estimate (e.g., a value) representing the combined effect of all the links (including the wireless link) along the route from the source (e.g., the application transmitter 305) to the destination (e.g., the application receiver 325). The feedback estimate determines the quality of the end-to-end communication path. In many instances, the wireless link is the primary contributor to the end-to-end delay and is the bottleneck link determining the end-to-end throughput.

The wireless transmitter 310 estimates the impact of the wireless link based on various parameters (e.g., throughput, jitter, and delay) using information 303 from the wireless receiver 320. For example, the information 303 can be a plurality of air-link acknowledgements received from the wireless receiver 320 or information from the physical layer entity. In one embodiment, the wireless transmitter 310 receives the plurality of air-link acknowledgements from the wireless receiver 320 (block 410).

The wireless transmitter 310 generates a first communication quality feedback message 301 using the information 303, for example, the plurality of air-link acknowledgements (block 415). The first communication quality feedback message 301 provides feedback regarding the achieved quality of the end-to-end communication. In one embodiment, the first communication quality feedback message 301 can be referred to as a low-latency local feedback (LLLF).

The first communication quality feedback message 301 may include a throughput component, a jitter component, and/or a delay component determined or generated by the wireless transmitter 310.

The throughput component may be estimated at the wireless transmitter 310 (i.e., at the local wireless link) by monitoring the packet queue corresponding to the application being sent by the application transmitter 305 or by monitoring the plurality of air-link resources allocated for delivery of the packets corresponding to the application being sent by the application transmitter 305. In one embodiment, the throughput component may be estimated in conjunction with the corresponding throughput parameter from the end-to-end feedback, where, for example, the minimum of the locally measured throughput and the throughput from the end-to-end feedback is reported by or in the first communication quality feedback message 301 (i.e., the LLLF).

In one embodiment, the throughput component can be calculated or determined as described in the following example. The application transmitter 305 generates data 304 at a rate R, and requests service at a rate R from the wireless transmitter 310. The system 300 responds by servicing the data 304 at a rate R'. The value of R' can be estimated by the wireless transmitter 310. One estimate for the value of R' is the rate at which the packets corresponding to the application are removed or sent from the queue at the wireless transmitter 310. If the system 100 includes an explicit allocation of the plurality of air-link resources for transmission of the data 304, then the throughput R' can be estimated by monitoring using the wireless transmitter 310, the resource allocation. The above estimate of the throughput component can be utilized when the wireless link is the bottleneck link along the route from the source to the destination.

If the end-to-end feedback estimate is available, then the wireless transmitter 310 can monitor the throughput calculation R" from the end-to-end feedback estimate. If the throughput calculation R" is less than the throughput estimate R' estimated by the wireless transmitter 310, then the first communication quality feedback message 301 can chose to report or transmit the throughput calculation R" to the application transmitter 305 or not provide any message or feedback to the application transmitter 305. The above estimate of the throughput component can be utilized when the wireless link is not necessarily the bottleneck link along the route from the source to the destination.

The jitter component may be estimated in conjunction with the corresponding jitter parameter from the end-to-end feedback, where, for example, the jitter parameter from the end-to-end feedback is reported by or in the first communication quality feedback message 301 (i.e., the LLLF) if the jitter parameter is higher than that measured locally at the wireless transmitter 310.

In one embodiment, the jitter component can be calculated or determined as described in the following example. The jitter component can include the jitter experienced due to the transmission at the wireless transmitter 310 and the jitter experienced from the end-to-end feedback (i.e., feedback throughout the system 300). The jitter experienced due to the transmission at the wireless transmitter 310 can be measured by monitoring the packet queue corresponding to the traffic originating from the application being sent by the application transmitter 305. If the jitter experienced from the end-to-end feedback is higher than the jitter experienced due to the transmission at the wireless transmitter 310, then the first communication quality feedback message 301 reports or transmits the higher jitter value to the application transmitter 305 or no message or feedback is generated or reported to the application transmitter 305.

The delay component may be estimated in conjunction with the corresponding delay parameter from the end-to-end feedback, where, for example, the delay parameter from the end-to-end feedback is used to estimate the component of the delay associated with the network 315, which is then added to the delay measured locally at the wireless transmitter 310, and reported by or in the first communication quality feedback message 301 (i.e., the LLLF).

In one embodiment, the delay component can be calculated or determined as described in the following example. The delay component (i.e., the round-trip delay experienced by the packets) can include the delay experienced due to the transmission at the wireless transmitter 310 and the delay experienced from the end-to-end feedback (i.e., feedback throughout the system 300). The delay experienced due to the transmission at the wireless transmitter 310 can be measured by monitoring the packet queue corresponding to the traffic originating from the application being sent by the application transmitter 305. If the end-to-end feedback is not available, then the wireless transmitter 310 adds a fixed offset to the delay measured by the wireless transmitter 310. In one embodiment, the fixed offset includes the network delay. If the end-to-end feedback is available, then the wireless transmitter 310 estimates the network delay using the round-trip delay included in the end-to-end feedback and the delay measured by the wireless transmitter 310. The wireless transmitter 310 can generate the delay component (i.e., a round-trip delay estimate) by adding the network delay estimated at the slower time scale and the wireless transmission delay estimated at the faster time scale. The first communication quality feedback message 301 reports or transmits the delay component value to the application transmitter 305 or no message or feedback is generated or reported to the application transmitter 305.

The wireless transmitter 310 may receive a second communication quality feedback message 302 from the application receiver 325 (block 420). The second communication quality feedback message 302 may be the end-to-end feedback estimate. In one embodiment, the second communication quality feedback message 302 is not transmitted from the application receiver 325 to the wireless transmitter 310.

The wireless transmitter 310 transmits the first and/or the second communication quality feedback message 301 and/or 302 to the application transmitter 305 in a standardized format (block 425). The first communication quality feedback message 301 from the wireless transmitter 310 is transmitted to the application transmitter 305 more frequently than the second communication quality feedback message 302 from the application receiver 325. Hence, the application transmitter 305 receives more frequent feedback estimates on the wireless link by obtaining faster and more frequent feedback via the first communication quality feedback message 301 from the wireless transmitter 310. The application transmitter 305 receives the first communication quality feedback message 301 with a smaller delay than with the end-to-end feedback estimate. The first communication quality feedback message 301 advantageously allows the application transmitter 305 to adjust or adapt its encoded rate faster to changes in the wireless link or medium. Furthermore, in one embodiment, other applications are not aware of the wireless transmitter 310 generating and delivering the first communication quality feedback message 301 to the application transmitter 305, thus allowing existing applications to make use of this invention. The application transmitter 305 can receive both the first and the second communication quality feedback messages 301 and 302, or can only receive the first communication quality feedback message 301.

The first and/or the second communication quality feedback message 301 and/or 302 may be encapsulated into a standardized packet format. In one embodiment, the standardized format is RTCP. The standardized format should be a format that is recognized by the application transmitter 305 and/or the same format used by the end-to-end feedback estimate or mechanism.

Figure 5:
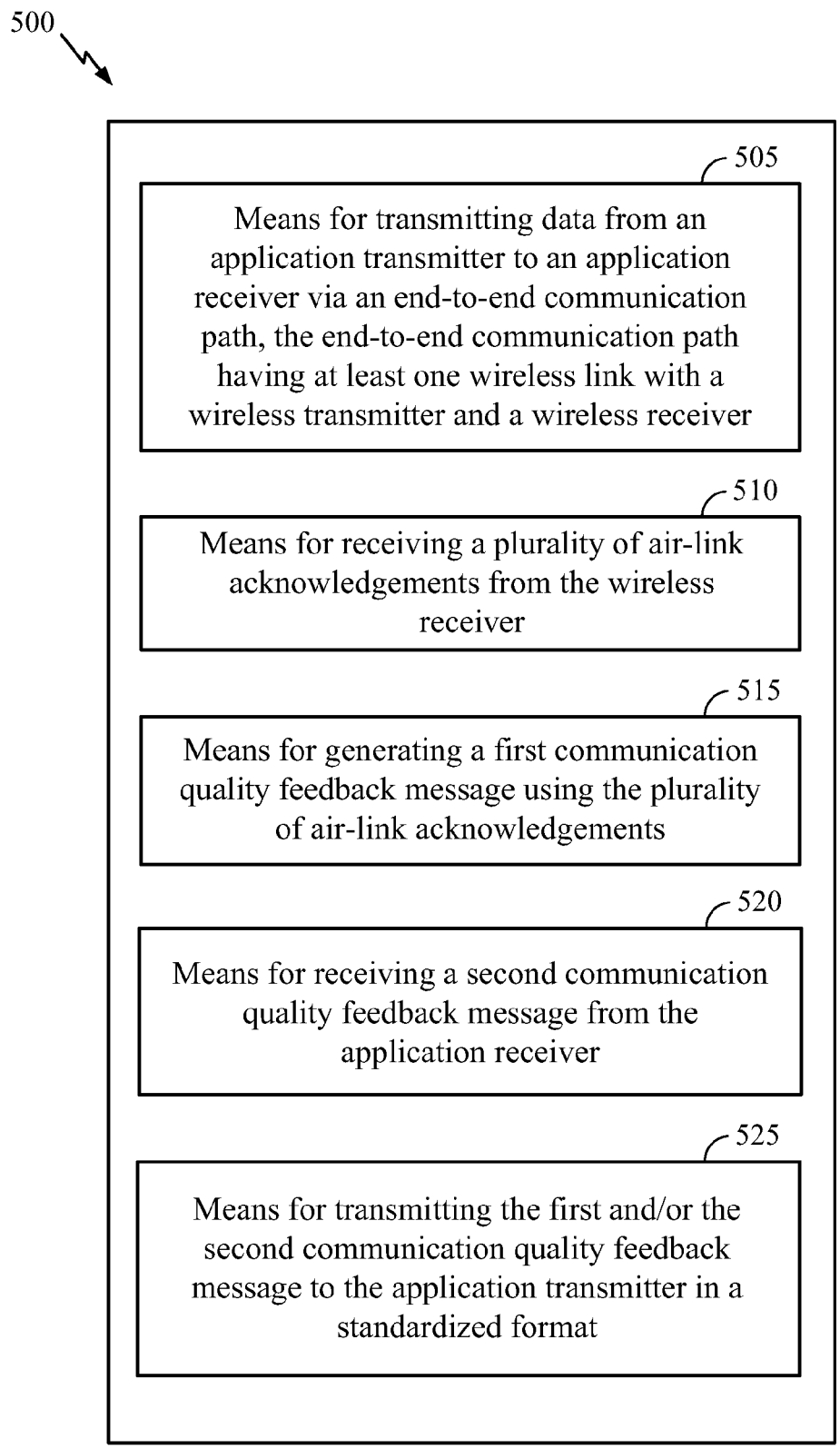
FIG. 5 is a block diagram illustrating exemplary components for the apparatus and the means for apparatus for providing a communication quality feedback of an end-to-end communication path between the application transmitter and the application receiver in accordance with various embodiments.

FIG. 5 is a block diagram illustrating exemplary components for the apparatus 500 and the means for apparatus 500 for providing a communication quality feedback of an end-to-end communication path between the application transmitter and the application receiver in accordance with various embodiments. The apparatus 500 may include a module 505 for transmitting data 304 from an application transmitter 305 to an application receiver 325 via an end-to-end communication path. The end-to-end communication path may have at least one wireless link with a wireless transmitter 310 and a wireless receiver 320. The apparatus may also include a module 510 for receiving a plurality of air-link acknowledgements 303 from the wireless receiver 320, a module 515 for generating a first communication quality feedback message 301 using the plurality of air-link acknowledgements, a module 520 for receiving a second communication quality feedback message 302 from the application receiver 325, and a module 525 for transmitting the first and/or the second communication quality feedback message 301 and/or 302 to the application transmitter 305 in a standardized format.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of providing a communication quality feedback of an end-to-end communication path between an application transmitter and an application receiver, the method comprising:
    transmitting data from the application transmitter to the application receiver via the end-to-end communication path, the end-to-end communication path having at least one wireless link with a wireless transmitter and a wireless receiver;
    generating, at the wireless transmitter, a first communication quality feedback message using data received from the wireless receiver;
    transmitting the first communication quality feedback message from the wireless transmitter to the application transmitter in a standardized format;
    receiving, at the wireless transmitter, a second communication quality feedback message from the application receiver; and
    transmitting the second communication quality feedback message from the wireless transmitter to the application transmitter in the standardized format; wherein the first communication quality feedback message is transmitted more frequently than the second communication quality feedback message.

2. The method of claim 1 wherein the standardized format is a real-time control protocol.

3. The method of claim 1 wherein the first communication quality feedback message includes at least one of a throughput component, a jitter component, or a delay component.

4. The method of claim 3 wherein the throughput component is estimated at the wireless transmitter by monitoring a packet queue corresponding to the data being transmitted by the application transmitter.

5. The method of claim 3 wherein the throughput component is estimated at the wireless transmitter by monitoring a plurality of air-link resources allocated for delivery of packets corresponding to the data being transmitted by the application transmitter.

6. The method of claim 3 wherein the throughput component is estimated in conjunction with a corresponding throughput parameter from the end-to-end communication path.

7. The method of claim 3 wherein the jitter component is estimated in conjunction with a corresponding jitter parameter from the end-to-end communication path.

8. The method of claim 3 wherein the delay component is estimated in conjunction with a corresponding delay parameter from the end-to-end communication path.

9. An apparatus for providing a communication quality feedback of an end-to-end communication path to an application receiver, the apparatus comprising:
    an application transmitter for transmitting data to the application receiver via the end-to-end communication path, the end-to-end communication path having at least one wireless link with a wireless transmitter and a wireless receiver, the wireless transmitter configured to generate a first communication quality feedback message using data received from the wireless receiver, and transmit the first communication quality feedback message from the wireless transmitter to the application transmitter in a standardized format;

wherein the wireless transmitter is configured to receive a second communication quality feedback message from the application receiver; and the application transmitter is configured to transmit the second communication quality feedback message from the wireless transmitter to the application transmitter in the standardized format, wherein the first communication quality feedback message is transmitted more frequently than the second communication quality feedback message.

10. The apparatus of claim 9 wherein the standardized format is a real-time control protocol.

11. The apparatus of claim 9 wherein the first communication quality feedback message includes at least one of a throughput component, a jitter component, or a delay component.

12. The apparatus of claim 11 wherein the throughput component is estimated at the wireless transmitter by monitoring a packet queue corresponding to the data being transmitted by the application transmitter.

13. The apparatus of claim 11 wherein the throughput component is estimated at the wireless transmitter by monitoring a plurality of air-link resources allocated for delivery of packets corresponding to the data being transmitted by the application transmitter.

14. The apparatus of claim 11 wherein the throughput component is estimated in conjunction with a corresponding throughput parameter from the end-to-end communication path.

15. The apparatus of claim 11 wherein the jitter component is estimated in conjunction with a corresponding jitter parameter from the end-to-end communication path.

16. The apparatus of claim 11 wherein the delay component is estimated in conjunction with a corresponding delay parameter from the end-to-end communication path.

17. An apparatus for providing a communication quality feedback of an end-to-end communication path to an application receiver, the apparatus comprising:
means for transmitting data to the application receiver via the end-to-end communication path, the end-to-end communication path having at least one wireless link with a wireless transmitter and a wireless receiver, the wireless transmitter configured to generate a first communication quality feedback message using data received from the wireless receiver, and transmit the first communication quality feedback message from the wireless transmitter to the application transmitter in a standardized format;
wherein the wireless transmitter is configured to receive a second communication quality feedback message from the application receiver; and the application transmitter is configured to transmit the second communication quality feedback message from the wireless transmitter to the application transmitter in the standardized format, wherein the first communication quality feedback message is transmitted more frequently than the second communication quality feedback message.

18. The apparatus of claim 17 wherein the standardized format is a real-time control protocol.

19. The apparatus of claim 17 wherein the first communication quality feedback message includes at least one of a throughput component, a jitter component, or a delay component.

20. The apparatus of claim 19 wherein the throughput component is estimated at the wireless transmitter by monitoring a packet queue corresponding to the data being transmitted by the application transmitter.

21. The apparatus of claim 19 wherein the throughput component is estimated at the wireless transmitter by monitoring a plurality of air-link resources allocated for delivery of packets corresponding to the data being transmitted by the application transmitter.

22. The apparatus of claim 19 wherein the throughput component is estimated in conjunction with a corresponding throughput parameter from the end-to-end communication path.

23. The apparatus of claim 19 wherein the jitter component is estimated in conjunction with a corresponding jitter parameter from the end-to-end communication path.

24. The apparatus of claim 19 wherein the delay component is estimated in conjunction with a corresponding delay parameter from the end-to-end communication path.

25. A non-transitory machine readable medium embodying instructions to implement a method of providing a communication quality feedback of an end-to-end communication path between an application transmitter and an application receiver, the instructions executable by a computer processor, the method comprising:
transmitting data from the application transmitter to the application receiver via the end-to-end communication path, the end-to-end communication path having at least one wireless link with a wireless transmitter and a wireless receiver;
generating, at the wireless transmitter, a first communication quality feedback message using data received from the wireless receiver;
transmitting the first communication quality feedback message from the wireless transmitter to the application transmitter in a standardized format;
receiving, at the wireless transmitter, a second communication quality feedback message from the application receiver; and
transmitting the second communication quality feedback message from the wireless transmitter to the application transmitter in the standardized format;
wherein the first communication quality feedback message is transmitted more frequently than the second communication quality feedback message.

26. The method of claim 25 wherein the standardized format is a real-time control protocol.

27. The method of claim 25 wherein the first communication quality feedback message includes at least one of a throughput component, a jitter component, or a delay component.

28. The method of claim 27 wherein the throughput component is estimated at the wireless transmitter by monitoring a packet queue corresponding to the data being transmitted by the application transmitter.

29. The method of claim 27 wherein the throughput component is estimated at the wireless transmitter by monitoring a plurality of air-link resources allocated for delivery of packets corresponding to the data being transmitted by the application transmitter.

30. The method of claim 27 wherein the throughput component is estimated in conjunction with a corresponding throughput parameter from the end-to-end communication path.

31. The method of claim 27 wherein the jitter component is estimated in conjunction with a corresponding jitter parameter from the end-to-end communication path.

32. The method of claim 27 wherein the delay component is estimated in conjunction with a corresponding delay parameter from the end-to-end communication path.

33. A method of providing a communication quality feedback of an end-to-end communication path between an application transmitter and an application receiver, the method comprising:
- transmitting data from the application transmitter to the application receiver via the end-to-end communication path, the end-to-end communication path having at least one wireless link with a wireless transmitter and a wireless receiver;
- generating, at the wireless transmitter, a first communication quality feedback message; and
- transmitting the first communication quality feedback message from the wireless transmitter to the application transmitter in a standardized format;
- wherein the first communication quality feedback message from the wireless transmitter is generated more frequently than a second communication quality feedback message from the application receiver.

34. An apparatus for providing a communication quality feedback of an end-to-end communication path to an application receiver, the apparatus comprising:
- an application transmitter for transmitting data to the application receiver via the end-to-end communication path, the end-to-end communication path having at least one wireless link with a wireless transmitter and a wireless receiver, the wireless transmitter configured to generate a first communication quality feedback message and transmit the first communication quality feedback message from the wireless transmitter to the application transmitter in a standardized format;
- wherein the first communication quality feedback message from the wireless transmitter is generated more frequently than a second communication quality feedback message from the application receiver.

35. An apparatus for providing a communication quality feedback of an end-to-end communication path to an application receiver, the apparatus comprising:
- means for transmitting data to the application receiver via the end-to-end communication path, the end-to-end communication path having at least one wireless link with a wireless transmitter and a wireless receiver, the wireless transmitter configured to generate a first communication quality feedback message and transmit the first communication quality feedback message from the wireless transmitter to the application transmitter in a standardized format;
- wherein the first communication quality feedback message from the wireless transmitter is generated more frequently than a second communication quality feedback message from the application receiver.

36. A non-transitory machine readable medium embodying instructions to implement a method of providing a communication quality feedback of an end-to-end communication path between an application transmitter and an application receiver, the instructions executable by a computer processor, the method comprising:
- transmitting data from the application transmitter to the application receiver via the end-to-end communication path, the end-to-end communication path having at least one wireless link with a wireless transmitter and a wireless receiver;
- generating, at the wireless transmitter, a first communication quality feedback message; and
- transmitting the first communication quality feedback message from the wireless transmitter to the application transmitter in a standardized format;
- wherein the first communication quality feedback message from the wireless transmitter is generated more frequently than a second communication quality feedback message from the application receiver.

\* \* \* \* \*